United States Patent
Kim et al.

(10) Patent No.: US 9,009,504 B2
(45) Date of Patent: Apr. 14, 2015

(54) ELECTRONIC DEVICE AND POWER SUPPLY SYSTEM OF ELECTRONIC DEVICE

(75) Inventors: Nam Yun Kim, Seoul (KR); Sang Wook Kwon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 163 days.

(21) Appl. No.: 13/225,120

(22) Filed: Sep. 2, 2011

(65) Prior Publication Data
US 2012/0066524 A1 Mar. 15, 2012

(30) Foreign Application Priority Data
Sep. 10, 2010 (KR) .................. 10-2010-0088677

(51) Int. Cl.
*G06F 1/00* (2006.01)
*G06F 1/26* (2006.01)
*H02J 17/00* (2006.01)

(52) U.S. Cl.
CPC .. *G06F 1/26* (2013.01); *H02J 17/00* (2013.01)

(58) Field of Classification Search
USPC .......................................... 713/310, 320, 321
See application file for complete search history.

(56) References Cited

U.S. PATENT DOCUMENTS

| 8,244,311 B2 * | 8/2012 | Boss et al. ................... 455/573 |
| 2005/0075146 A1 | 4/2005 | Kridner |
| 2005/0151511 A1 * | 7/2005 | Chary ........................... 320/127 |
| 2008/0059823 A1 * | 3/2008 | Balatsos et al. .............. 713/323 |
| 2008/0067874 A1 | 3/2008 | Tseng |
| 2009/0174263 A1 | 7/2009 | Baarman et al. |
| 2010/0036773 A1 | 2/2010 | Bennett |
| 2010/0052811 A1 | 3/2010 | Smith et al. |
| 2010/0182207 A1 * | 7/2010 | Miyata et al. ................. 343/702 |
| 2010/0201313 A1 * | 8/2010 | Vorenkamp et al. .......... 320/108 |

FOREIGN PATENT DOCUMENTS

| JP | 2003-143780 | 5/2003 |
| JP | 2006-197734 | 7/2006 |
| JP | 2007-336788 | 12/2007 |
| JP | 2010-011588 | 1/2010 |

OTHER PUBLICATIONS

International Search Report for International Application No. PCT/KR2011/006445 dated Mar. 22, 2012 (3pp, in English).

* cited by examiner

*Primary Examiner* — Jaweed A Abbaszadeh
*Assistant Examiner* — Alyaa T Mazyad
(74) *Attorney, Agent, or Firm* — NSIP Law

(57) ABSTRACT

An electronic device and a power supplying system of the electronic device are provided. A power supplying method for an electronic device may include: obtaining information regarding power transmission efficiency between a source electronic device and a target electronic device; obtaining power for decoding and playback of multimedia data in the target electronic device; generating resonance power based on the power transmission efficiency and the obtained power; and transmitting the generated resonance power and multimedia data to the target electronic device.

15 Claims, 15 Drawing Sheets

300

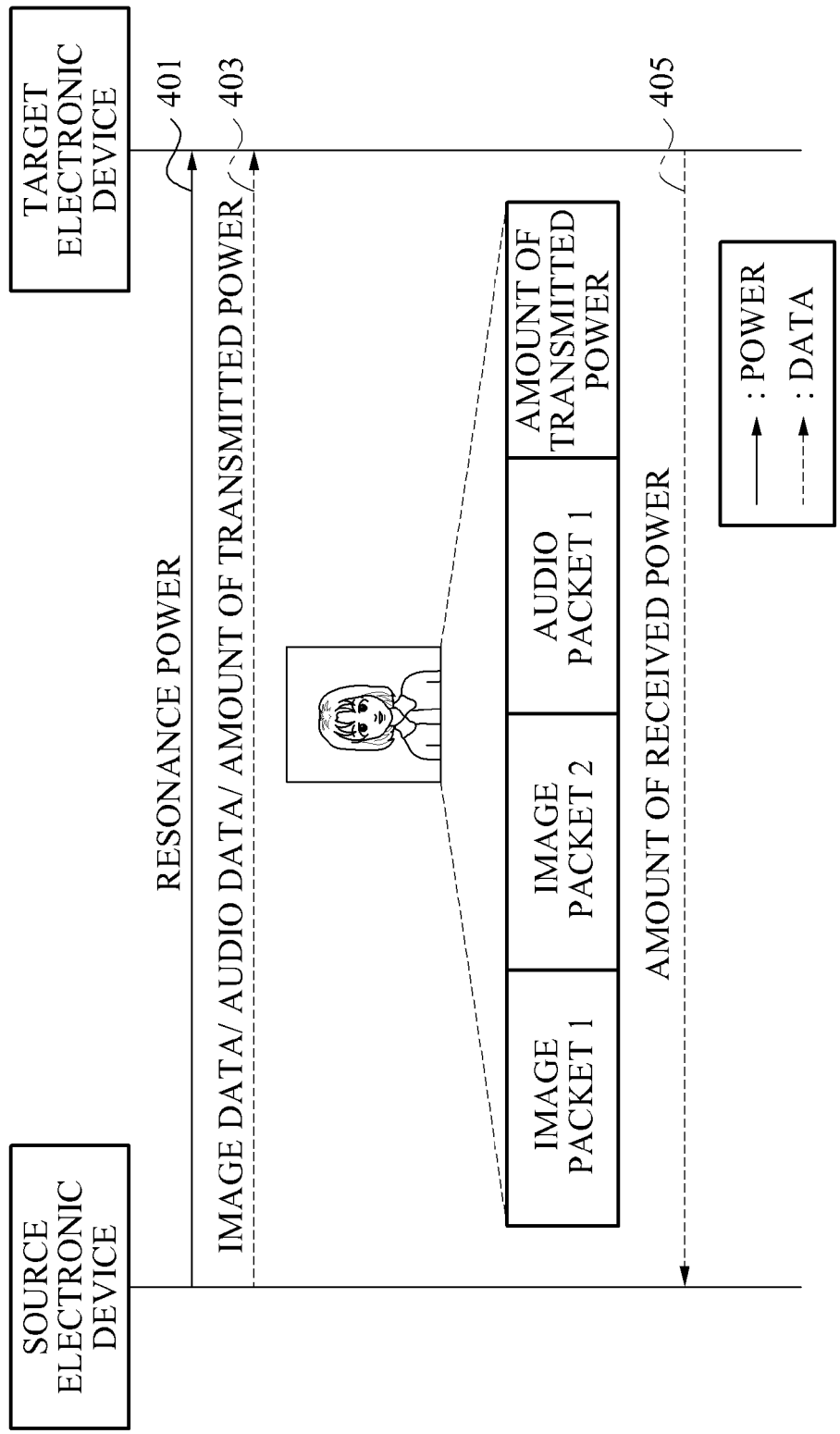

$$\omega_{MZR} = \frac{1}{\sqrt{L_R C_L}}$$

ELECTRONIC DEVICE AND POWER SUPPLY SYSTEM OF ELECTRONIC DEVICE

CROSS-REFERENCE TO RELATED APPLICATION(S)

This application claims the benefit under 35 U.S.C. §119 (a) of Korean Patent Application No. 10-2010-0088677, filed on Sep. 10, 2010, in the Korean Intellectual Property Office, the entire disclosure of which is incorporated herein by reference for all purposes.

BACKGROUND

1. Field

The following description relates to a power supply for electronic devices.

2. Description of Related Art

Conventional resonance power transferring systems may include a source electronic device for transmitting the resonance power, and a target electronic device for receiving the resonance power. The resonance power may be wirelessly transmitted from the source electronic device to the target electronic device, for instance, through a magnetic coupling.

When the target electronic device plays back multimedia data, power may be provided, taking into account of power transmission efficiency.

SUMMARY

According to an aspect, a power supplying method for an electronic device may include: obtaining information regarding power transmission efficiency between a source electronic device and a target electronic device; obtaining power for decoding and playback of multimedia data in the target electronic device; generating resonance power based on the power transmission efficiency and the obtained power; and transmitting the generated resonance power and multimedia data to the target electronic device.

The obtaining of the power transmission efficiency information may include: transmitting, to the target electronic device, calibration power for calibration of supply of power and information associated with an amount of the calibration power; and receiving the power transmission efficiency information from the target electronic device.

The obtaining of the power may include: decoding the multimedia data; obtaining decoding power corresponding to an amount of power to be used for decoding the multimedia data; and obtaining playback power corresponding to an amount of power to be used for playback of the multimedia data in the target electronic device, wherein the decoding power and the playback power are obtained in response to the decoding of the multimedia data.

An amount of the generated resonance power may be determined based on the power transmission efficiency information, the decoding power, and the playback power.

The obtaining of the power may include: encoding, by the source electronic device, the multimedia data; obtaining encoding power corresponding to an amount of power to be used for encoding the multimedia data; and obtaining playback power corresponding to an amount of power to be used for playback of the multimedia data in the target electronic device, wherein the encoding power and the playback power are obtained in response to the decoding of the multimedia data.

The amount of the generated resonance power may be determined based on the power transmission efficiency information, the encoding power, the playback power, or any combination thereof.

According to another aspect, a power supplying method for an electronic device may include: calculating power transmission efficiency between a source electronic device and a target electronic device; transmitting information regarding to the power transmission efficiency to the source electronic device; receiving, from the source electronic device, multimedia data, and receiving, from the source electronic device, a resonance power to be used for decoding and playback of the multimedia data; and decoding the multimedia data and performing playback of the decoded multimedia data, based on the received resonance power.

The calculating of the power transmission efficiency may include: receiving calibration power for calibration of supply of power; receiving information associated with an amount of the calibration power; and calculating the power transmission efficiency based on an amount of the received calibration power and the information associated with the amount of the calibration power.

An amount of the resonance power may vary based on the power transmission efficiency information and a power corresponding to an amount of power to be used for decoding and playback of the multimedia data in the target electronic device.

According to yet another aspect, a source electronic device may include: a source controlling unit configured to obtain information regarding power transmission efficiency between a source electronic device and a target electronic device, and to obtain a power corresponding to an amount of power to be used for decoding and playback of multimedia data in the target electronic device; a resonance power generating unit configured to generate a resonance power based on the power transmission efficiency information and the power; a source resonance unit configured to transmit the generated resonance power to the target electronic device; and a multimedia data processing unit configured to transmit the multimedia data to the target electronic device.

The source controlling unit may transmit calibration power for calibration of supply of power and information associated with an amount of the calibration power.

The source controlling unit may obtain decoding power corresponding to an amount of power to be used for decoding the multimedia data, obtain playback power to be used for playback of the multimedia data in the target electronic device, and determine an amount of the resonance power based on the power transmission efficiency information, the decoding power, the playback power, or any combination thereof.

The source controlling unit may obtain encoding power corresponding to an amount of power to be used for encoding the multimedia data, obtain playback power to be used for playback of the multimedia data in the target electronic device, and determine the resonance power based on the power transmission efficiency information, the encoding power, the playback power, or any combination thereof.

According to a further aspect, a target electronic device may include: a target controlling unit configured to calculate power transmission efficiency between a source electronic device and a target electronic device, and to transmit information regarding the power transmission efficiency to the source electronic device; a target resonance unit configured to receive resonance power to be used for decoding and playback of the multimedia data; a voltage converting unit configured to generate DC power from the received resonance power; and a data processing unit configured to receive multimedia data from the source electronic device, to decode the multimedia data using the DC power, and to perform playback of the decoded multimedia data.

The target resonance unit may receive calibration power for calibration of supply of power; and the target controlling unit may calculate the power transmission efficiency information based on an amount of the calibration power received from the source electronic device and information associated with an amount of the calibration power.

The amount of the resonance power may vary based on the power transmission efficiency information and power corresponding to an amount of power to be used for decoding and playback of the multimedia data in the target electronic device.

Other features and aspects may be apparent from the following detailed description, the drawings, and the claims.

BRIEF DESCRIPTION OF THE DRAWINGS

FIG. 4B is a diagram illustrating another power supplying method of an electronic device.

Figure 1:
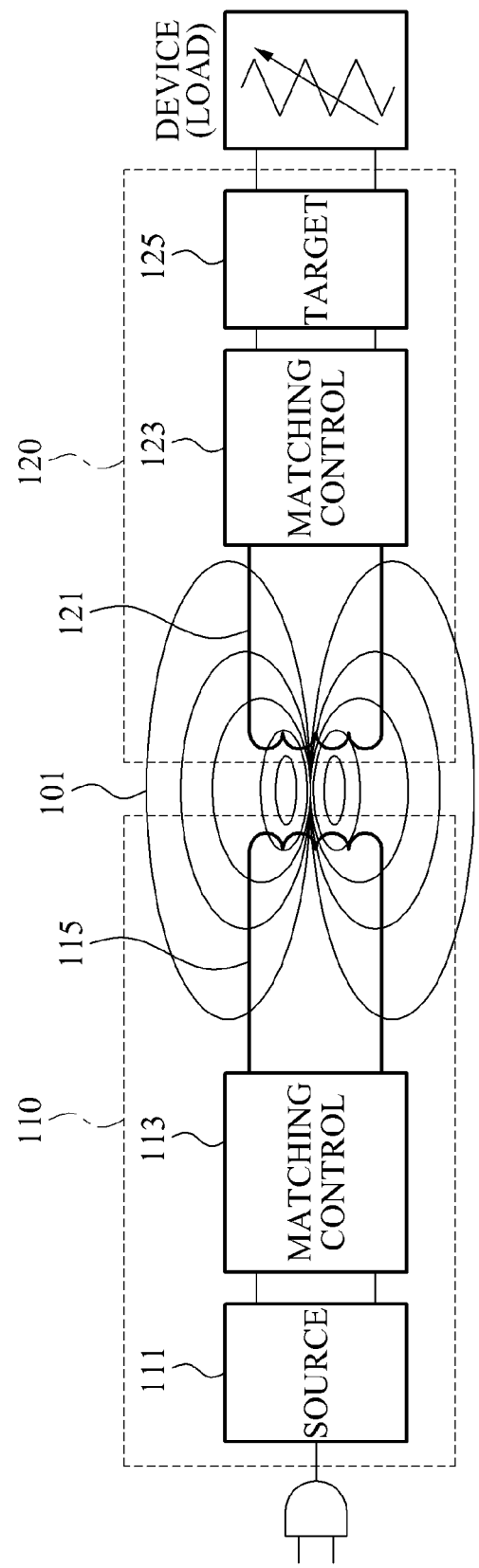
FIG. 1 is a diagram illustrating a power supplying system of an electronic device.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein may be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1 illustrates a power supplying system of an electronic device.

In one or more embodiments, power transmitted may be resonance power.

As shown in FIG. 1, the power supplying system may have a source-target structure including a source and a target. For example, the power supplying system may include a source electronic device 110 corresponding to the source and a target electronic device 120 corresponding to the target.

The source electronic device 110 may include a source unit 111 and a source resonator 115. The source unit 111 may be configured to receive energy from an external voltage supplier to generate a resonance power. In some instances, the source electronic device 110 may further include a matching control 113 to perform resonance frequency or impedance matching.

The source unit 111 may include an alternating current (AC)-to-AC (AC/AC) converter, an AC-to-direct current (DC) (AC/DC) converter, and/or a (DC/AC) inverter. The AC/AC converter may be configured to adjust, to a desired level, a signal level of an AC signal input from an external device. And the AC/DC converter may output a DC voltage at a predetermined level by rectifying an AC signal output from the AC/AC converter. The DC/AC inverter may be configured to generate an AC signal (e.g., in a band of a few megahertz (MHz) to tens of MHz) by quickly switching a DC voltage output from the AC/DC converter. Of course, other frequencies of AC power are also possible.

The matching control 113 may be configured to set at least a resonance bandwidth of the source resonator 115, an impedance matching frequency of the source resonator 115, or both. In some implementations, the matching control 113 may include at least one of a source resonance bandwidth setting unit and a source matching frequency setting unit. And the source resonance bandwidth setting unit may set the resonance bandwidth of the source resonator 115. The source matching frequency setting unit may set the impedance matching frequency of the source resonator 115. For example, a Q-factor of the source resonator 115 may be determined based on setting of the resonance bandwidth of the source resonator 115 or setting of the impedance matching frequency of the source resonator 115.

The source resonator 115 may be configured to transfer electromagnetic energy to a target resonator 121. For example, the source resonator 115 may transfer the resonance power to the target electronic device 120 through magnetic coupling 101 with the target resonator 121. Accordingly, the source resonator 115 may be configured to resonate within the set resonance bandwidth.

As shown, the target electronic device 120 may include the target resonator 121, a matching control 123 to perform resonance frequency or impedance matching, and a target unit 125 to transfer the received resonance power to a device or a load.

The target resonator 121 may be configured to receive the electromagnetic energy from the source resonator 115. The target resonator 121 may be configured to resonate within the set resonance bandwidth.

The matching control 123 may set at least one of a resonance bandwidth of the target resonator 121 and an impedance matching frequency of the target resonator 121. In some instances, the matching control 123 may include at least one of a target resonance bandwidth setting unit and a target matching frequency setting unit. The target resonance bandwidth setting unit may set the resonance bandwidth of the target resonator 121. The target matching frequency setting unit may be configured to set the impedance matching frequency of the target resonator 121. For example, a Q-factor of the target resonator 121 may be determined based on setting of the resonance bandwidth of the target resonator 121 or setting of the impedance matching frequency of the target resonator 121.

The target unit 125 may be configured to transfer the received resonance power to the load. The target unit 125 may include an AC/DC converter and a DC/DC converter. The AC/DC converter may generate a DC voltage by rectifying an AC signal transmitted from the source resonator 115 to the target resonator 121. And the DC/DC converter may supply a rated voltage to a device or the load by adjusting a voltage level of the DC voltage.

For example, the AC/DC converter may be configured as an active rectifier utilizing a delay locked loop.

In one or more embodiments, the source resonator 115 and the target resonator 121 may be configured as a helix coil structured resonator, a spiral coil structured resonator, a meta-structured resonator, or the like.

Referring to FIG. 1, controlling the Q-factor may include setting the resonance bandwidth of the source resonator 115 and the resonance bandwidth of the target resonator 121, and transferring the electromagnetic energy from the source resonator 115 to the target resonator 121 through magnetic coupling 101 between the source resonator 115 and the target resonator 121. The resonance bandwidth of the source resonator 115 may be set to be wider or narrower than the resonance bandwidth of the target resonator 121 in some instances. For example, an unbalanced relationship between a BW-factor of the source resonator 115 and a BW-factor of the target resonator 121 may be maintained by setting the resonance bandwidth of the source resonator 115 to be wider or narrower than the resonance bandwidth of the target resonator 121.

For a power supply employing a resonance scheme, the resonance bandwidth may be an important factor. When the Q-factor (e.g., considering a change in a distance between the source resonator 115 and the target resonator 121, a change in the resonance impedance, impedance mismatching, a reflected signal, and/or the like), is Qt, Qt may have an inverse-proportional relationship with the resonance bandwidth, as given by Equation 1.

$$\frac{\Delta f}{f_0} = \frac{1}{Qt} = \Gamma_{S,D} + \frac{1}{BW_S} + \frac{1}{BW_D}$$ [Equation 1]

In Equation 1, f0 denotes a central frequency, Δf denotes a change in a bandwidth, $\Gamma_{S,D}$ denotes a reflection loss between the source resonator 115 and the target resonator 121, BWS denotes the resonance bandwidth of the source resonator 115, and BWD denotes the resonance bandwidth of the target resonator 121. In Equation 1, the BW-factor may indicate either 1/BWS or 1/BWD.

Due to an external effect, for example, a change in the distance between the source resonator 115 and the target resonator 121, a change in a location of at least one of the source resonator 115 and the target resonator 121, and/or the like, impedance mismatching between the source resonator 115 and the target resonator 121 may occur. The impedance mismatching may be a direct cause in decreasing an efficiency of power transfer. When a reflected wave corresponding to a transmission signal that is partially reflected and returned is detected, the matching control 113 may be configured to determine the impedance mismatching has occurred, and may perform impedance matching. The matching control 113 may change a resonance frequency by detecting a resonance point through a waveform analysis of the reflected wave. The matching control 113 may determine, as the resonance frequency, a frequency having a minimum amplitude in the waveform of the reflected wave.

Figure 5:
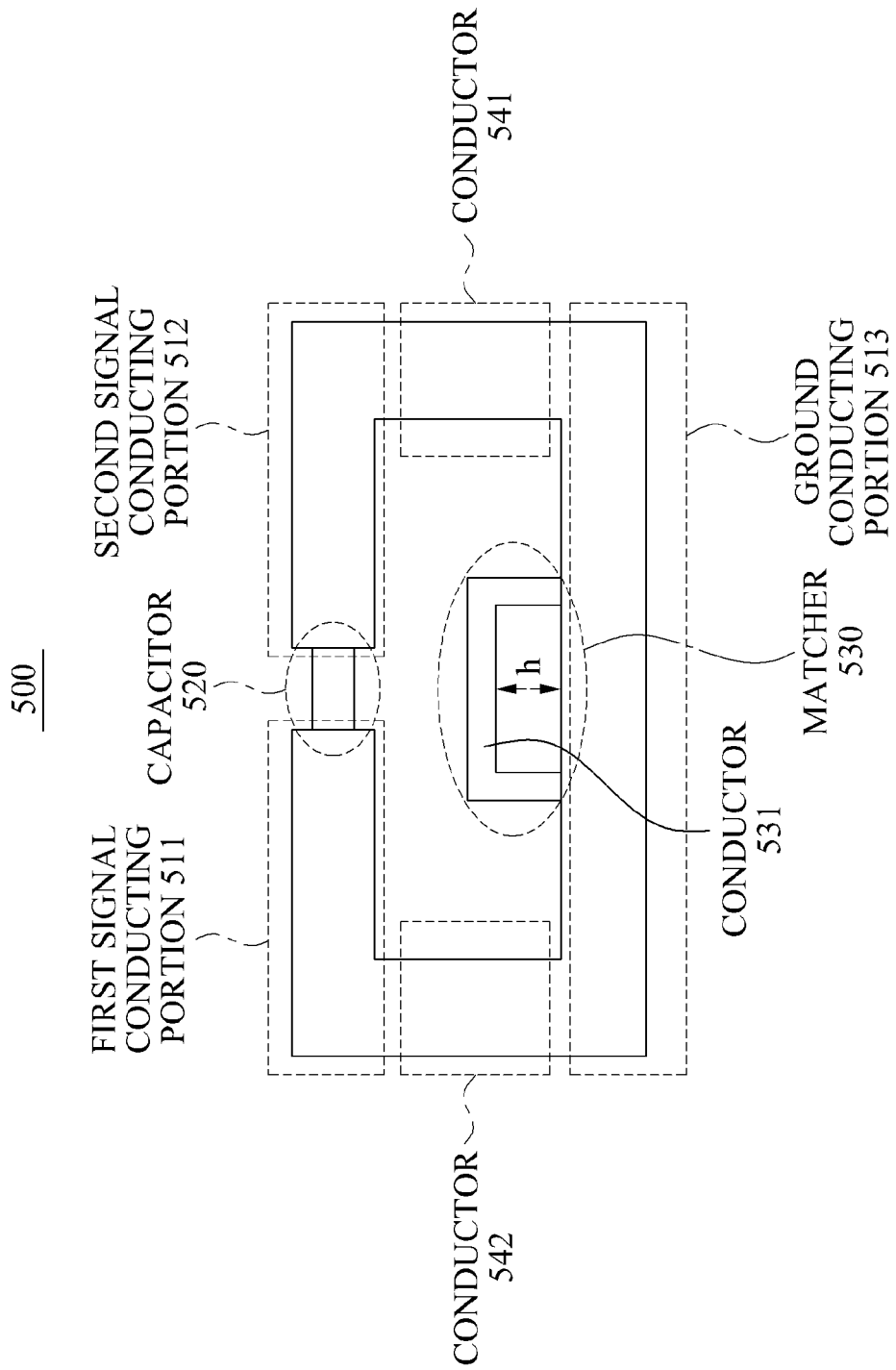
FIGS. 5 through 11 are diagrams illustrating various resonators.

The source resonator 115 and/or the target resonator 121 in FIG. 5 may have a resonator structure illustrated in FIGS. 5 through 11.

Figure 2A:
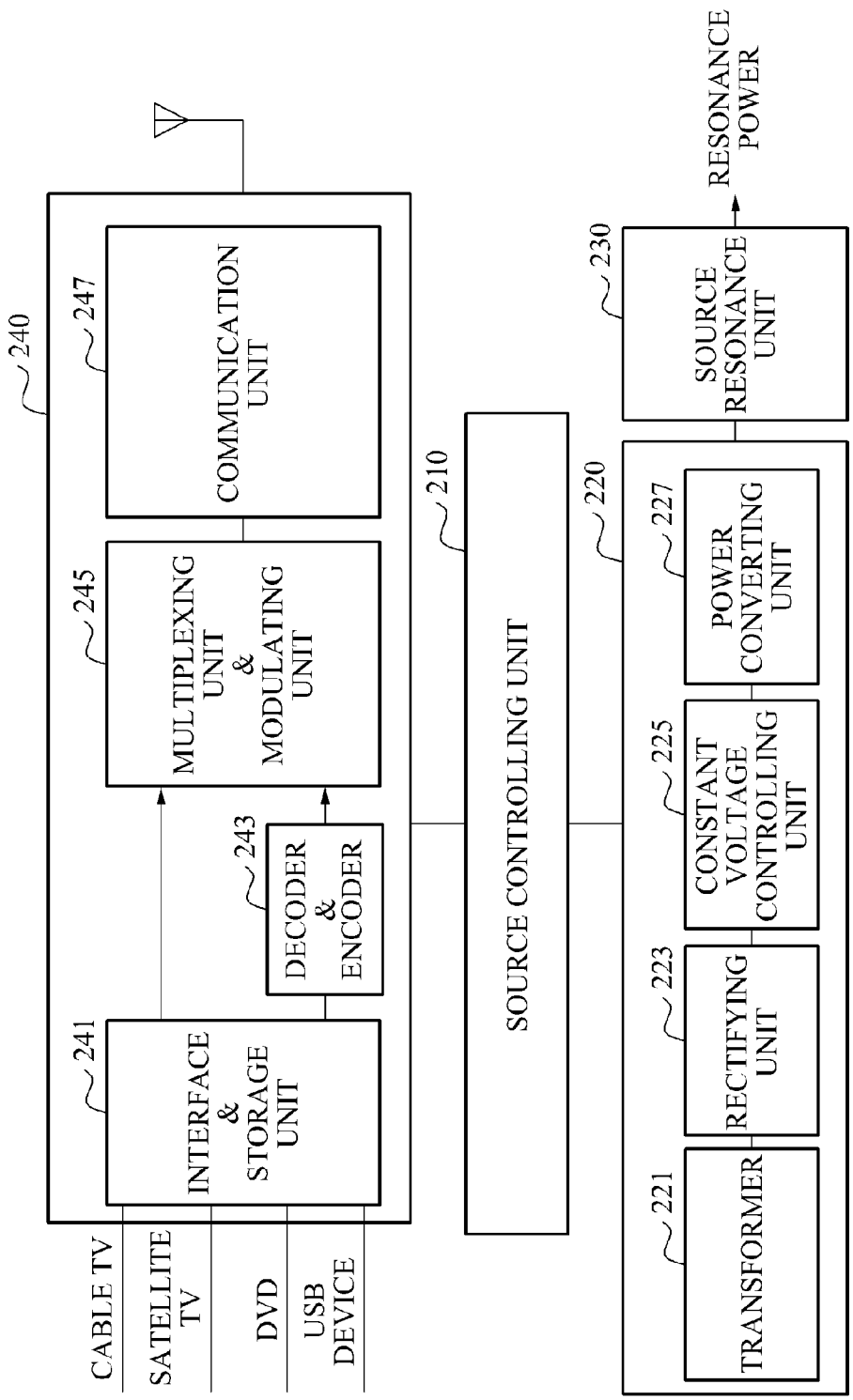
FIG. 2A is a diagram illustrating a source electronic device.
Figure 3:
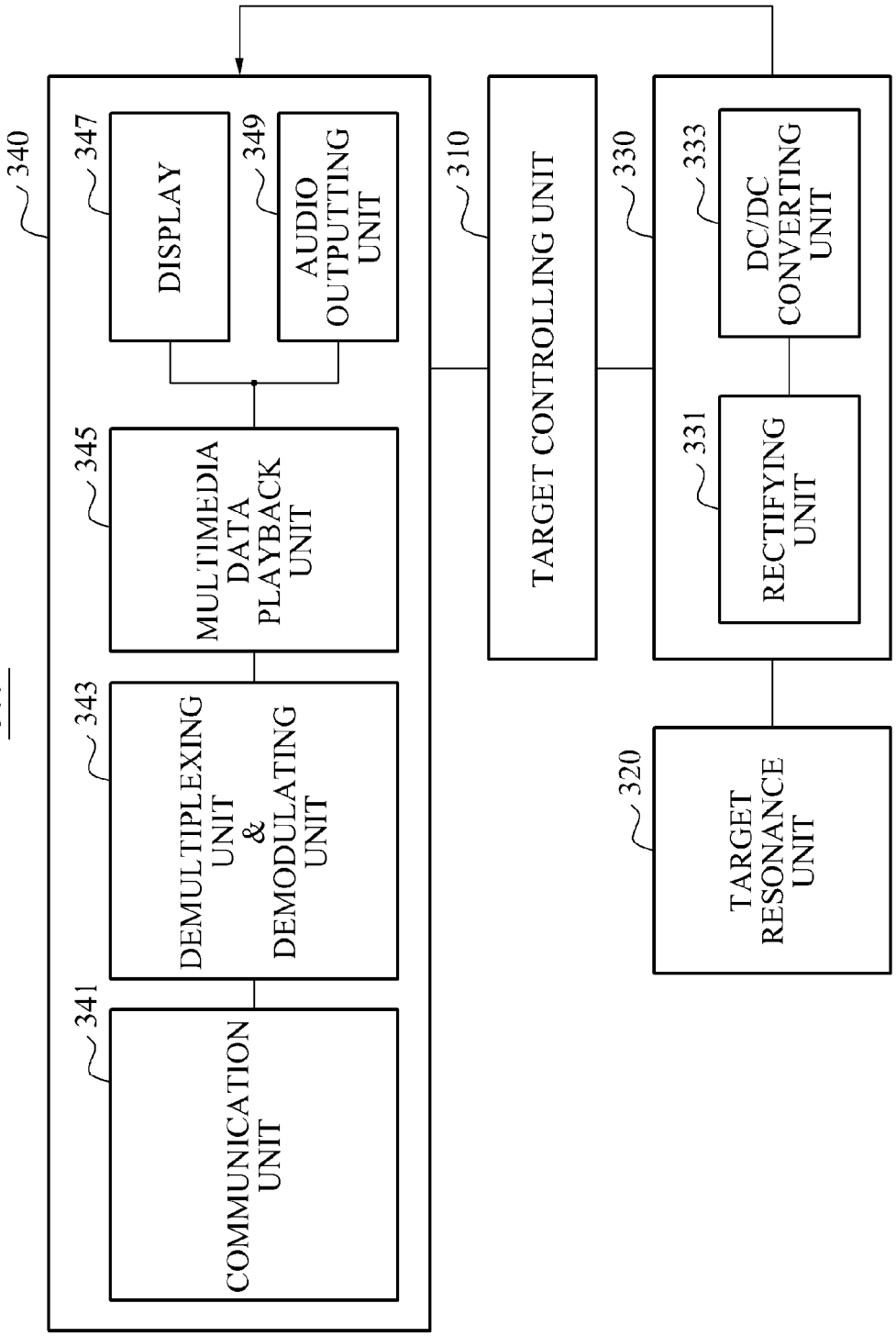
FIG. 3 is a diagram illustrating a target electronic device.

FIG. 2A illustrates a source electronic device 200 and FIG. 3 illustrates a target electronic device 300, which may be used together.

Referring to FIG. 2A, the source electronic device 200 may include a source controlling unit 210, a resonance power generating unit 220, a source resonance unit 230, and a multimedia data processing unit 240.

The source electronic device 200 may be configured to transfer a resonance power to the target electronic device 300 through magnetic coupling, and may transmit the multimedia data to the target electronic device 300. For example, the multimedia data may include an image, audio data, text data, document data, television broadcasting signals, and/or the like.

The source controlling unit 210 may obtain information regarding power transmission efficiency between the source electronic device 200 and the target electronic device 300. The source controlling unit 210 may obtain a power $P_t$ corresponding to an amount of power to be used for decoding and playback of the multimedia data in the target electronic device 300. For instance, the information regarding the power transmission efficiency between the source electronic device 200 and the target electronic device 300 may be obtained by receiving a calculated value from the target electronic device 300.

The source controlling unit 210 may be configured to transmit, to the target electronic device 300 a calibration power for calibration of supply of power. Transmission may be made through a magnetic coupling, for example. The source controlling unit 210 may transmit, to the target electronic device 300, the calibration power via the source resonance unit 230. The source controlling unit 210 may transmit, to the target electronic device 300, information associated with the calibration power. In some implementations, the source controlling unit 210 may announce the amount of the calibration power, to the communication unit 247 of FIG. 2 or to the target electronic device 300 via a data transmitting unit The source controlling unit 210 may be configured to obtain a power $P_{sde}$ corresponding to an amount of power to be used for decoding the multimedia data. The source controlling unit 210 may obtain the power $P_{sde}$ by measuring an amount of power expended for decoding the multimedia data in the multimedia data processing unit 240.

Moreover, the source controlling unit 210 may obtain a power $P_p$ to be used for playback of the multimedia data in the target electronic device 300. The power $P_p$ may be power expended for displaying the multimedia data in the target electronic device 300 or may be power expended for outputting the multimedia data through a speaker. The power $P_p$ may be determined based on a resolution supported in the target electronic device 300, a capacity of the speaker included in the target electronic device 300, and the like. The power $P_p$ may be stored in advance in the source electronic device 200, or may be obtained by performing initial tuning between the source electronic device 200 and the target electronic device 300.

And the source controlling unit 210 may be configured to determine a power $P_{out}$ corresponding to an amount of a resonance power generated from the resonance power generating unit 220, based on the power transmission efficiency information, the power $P_{sde}$, and the power $P_p$. For example, the power $P_{out}$ may be determined according to Equation 2.

$$P_{out} = (P_{sde} + P_p + M)/E_{ST}$$ [Equation 2]

In Equation 2, M denotes an amount of power expended for remaining operations excluding decoding and playback of the multimedia data, and $E_{ST}$ denotes the power transmission efficiency between the source electronic device 200 and the target electronic device 300. M may be a value stored in the source electronic device 200 based on a prior test.

The source controlling unit 210 may obtain power $P_{sen}$ corresponding to an amount of power to be used for encoding multimedia data. The source controlling unit 210 may obtain the power $P_{sen}$ by measuring power expended for encoding the multimedia data. The source controlling unit 210 may determine the power $P_{out}$ corresponding to the amount of power of the resonance power generated from the resonance power generating unit 220, based on the power transmission efficiency, the power $P_{sde}$, and the power $P_p$. For example, the power $P_{out}$ may be determined according to Equation 3.

$$P_{out} = \{(P_{sen} \times T) + P_p + M\}/E_{ST} \quad \text{[Equation 3]}$$

In Equation 3, T denotes a ratio of the amount of power to be used for encoding the multimedia data and the amount of power to be used for decoding the multimedia data. T may be stored in the source electronic device 200 based on prior test(s).

The amount of power $P_t$ expended for decoding and playback of the multimedia data may vary in real-time. A time-$P_{out}$ graph may be expressed in a predetermined curve, and the source controlling unit 210 may control a power level of the $P_{out}$ based on the predetermined curve of the time-$P_{out}$ graph.

The resonance power generating unit 220 may be configured to generate resonance power based on the power transmission efficiency and the power $P_t$. The resonance power generating unit 220 may generate the resonance power based on Equation 2 or Equation 3, discussed above. For instance, the resonance power may be substantially equal to the power $P_{out}$ determined in Equation 2 or Equation 3. The resonance power generating unit 220 may include a transformer 221, a rectifying unit 223, a constant voltage controlling unit 225, and a power converting unit 227 in various embodiments.

The transformer 221 may be configured to adjust, to a desired level, a signal level of an AC signal of a first frequency inputted from an external device. For example, the first frequency band may be, for example, several dozens of hertz (Hz).

The rectifying unit 223 may rectify an AC signal outputted from the transformer 221, and may output a DC signal.

The constant voltage controlling unit 225 may output a DC voltage of a predetermined level, based on a control of the source controlling unit 210. The constant voltage controlling unit 225 may configured to include a stabilization circuit for outputting the DC voltage of the predetermined level. The voltage level of the DC voltage outputted from the constant voltage controlling unit 225 may be a value substantially corresponding to the power $P_{out}$ determined based on Equation 2 or Equation 3.

The power converting unit 227 may be configured to convert the DC voltage of the predetermined level into an AC power, based on a switching pulse signal in a second frequency band. Accordingly, the power converting unit 227 may be configured to include an AC/DC inverter. For example, the second frequency band may be a few MHz to several dozens of MHz. And, in some instances, the second frequency band may be in a range from 2 MHz to 20 MHz. The AC/DC inverter may generate resonance power by converting the DC signal outputted from the constant voltage controlling unit 225 to an AC signal.

The AC/DC inverter may convert, for example, based on the switching pulse signal in the second frequency band, the DC voltage of the predetermined level outputted from the constant voltage controlling unit 225 to an AC voltage. The AC/DC inverter may include a switching device for a high speed switching. For example, the switching device may be switched ON when the switching pulse signal is "high" (e.g., at or near its peak) and may be switched OFF when the switching pulse signal is "low" (e.g., at or near its minimum).

The source resonance unit 230 may transfer the generated resonance power to the target electronic device 300, for instance, through magnetic coupling. In one or more embodiments, the source resonance unit 230 may include a matching control 113 and the source resonator 115 of FIG. 1.

The multimedia data processing unit 240 may transmit the multimedia data to the target electronic device. In some instances, the multimedia data may be received from an external device or may be stored, in advance, in the multimedia data processing unit 240. As shown, the multimedia data processing unit 240 may include an interface & storage unit 241, a decoder & encoder 243, a multiplexing unit & modulating unit, and a communication unit 247.

The interface & storage unit 241 may receive the multimedia data from the external device, and may output the received multimedia data to the multiplexing unit & modulating unit 245 or the decoder & encoder 243. The interface & storage unit 241 may store the multimedia data. The multimedia data stored in the interface & storage unit 241 may be transmitted, to the target electronic device 300, in a form of streaming or in a form of a file. The multimedia data received from the external device may be transmitted, to the target electronic device 300, via the multiplexing unit & modulating unit 245. The multimedia data stored in the interface & storage unit 241 may be encoded in the decoder & encoder 243 and may be transmitted to the target electronic device 300.

Referring to FIG. 2A, the interface & storage unit 241 may receive, as an input, a broadcasting signal of a cable television (TV), a broadcasting signal of a satellite TV, moving picture data of a DVD player, and data stored in an external universal serial bus (USB) device.

The decoder & encoder 243 may decode the multimedia data or may encode the multimedia data. For example, the decoder & encoder 243 may decode multimedia data received from an external device, and may encode multimedia data stored in the interface & storage unit 241. The power $P_{sde}$ may be obtained, in real-time, by decoding the multimedia data received from the external device. The power $P_{sen}$ may be obtained by encoding the multimedia data stored in the interface & storage unit 241.

The multiplexing unit & modulating unit 245 may multiplex or packetize various types of multimedia data and may output the multiplexed or packetized multimedia data to the communication unit 247. The multiplexing unit & modulating unit 245 may multiplex signaling data for performing signaling with the target electronic device 300 or may output the signaling data to the communication unit 247. When data transmitted to the target electronic device 300 needs to be modulated, the multiplexing unit & modulating unit 245 may modulate the data transmitted to the target electronic device 300.

The communication unit 247 may transmit, to the target electronic device 300, the multimedia data outputted from the multiplexing unit and modulating unit 245. The communication unit 247 may perform communication with the target electronic device 300, using high speed data transmission (e.g., GHz speed), a wireless local area network (LAN), a short-range data transmission, and/or the like.

Figure 2B:
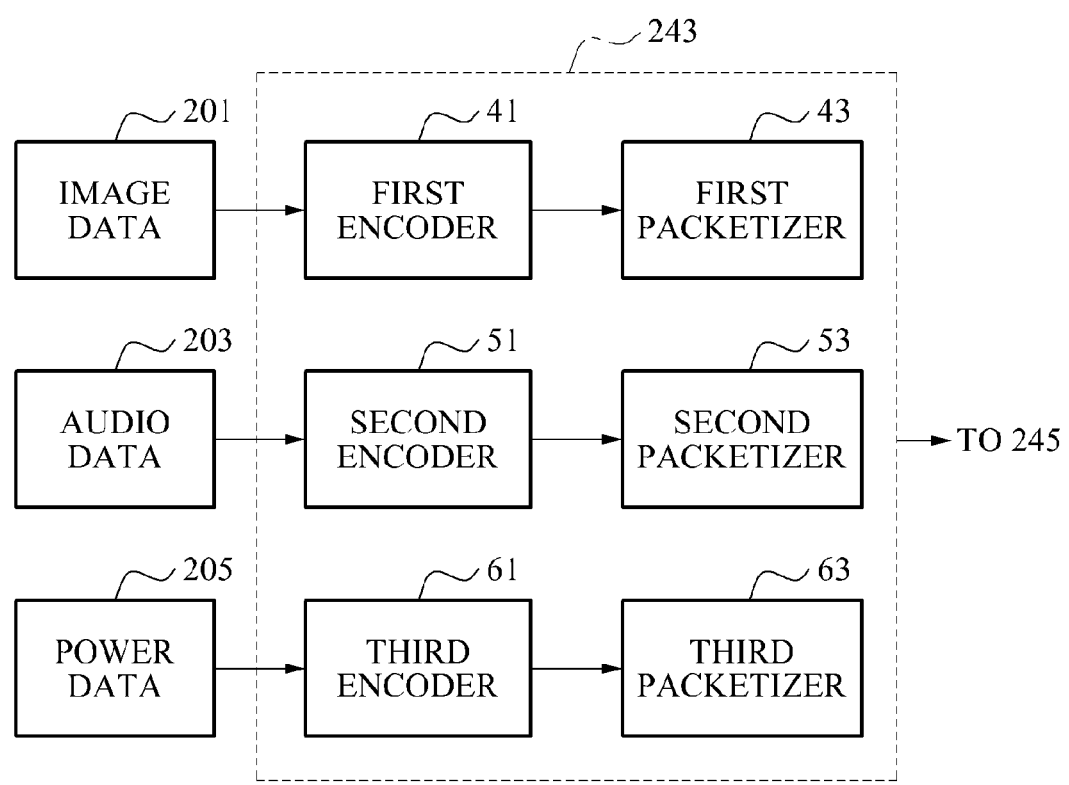
FIG. 2B is a diagram illustrating one decoder and encoder of FIG. 2A.

FIG. 2B illustrates the decoder & encoder 243 of FIG. 2A.

Referring to FIG. 2B, the decoder & encoder 243 may include a first encoder 41 that encoders image data 201. The decoder & encoder 243 may include a second encoder 51 that encodes audio data 203. The decoder & encoder 243 may include a third encoder 61 that encodes power data 205. For example, the power data 205 may be a value corresponding to $P_{out}$ generated from the resonance power generating unit 220.

The data outputted from the first encoder 41 may be packetized by a first packetizer 43, data outputted from the second encoder 51 may be packetized by a second packetizer 53, and data outputted from the third encoder 61 may be packetized by a third packetizer 63. And respective data outputted from the first packetizer 43, the second packetizer 53, and the third packetizer 63 may be transmitted to the multiplexing unit & modulating unit 245 and may be multiplexed. Referring to FIG. 2B, the source electronic device 200 may announce an amount of currently generated resonance power to the target electronic device 300.

Referring to FIG. 3, the target electronic device 300 may include a target controlling unit 310, a target resonance unit 320, a voltage converting unit 330, and a multimedia data processing unit 340.

The target controlling unit 310 may calculate the power transmission efficiency between the source electronic device 200 and the target electronic device 300, and may transmit the power transmission efficiency to the source electronic device 200. The target controlling unit 310 may announce, to the source electronic device 200, the power transmission efficiency to the communication unit 341 of FIG. 3 or a data transmitting unit.

The target controlling unit 310 may calculate the power transmission efficiency based on an amount of calibration power actually received from the source electronic device and information associated with an amount of the calibration power. For example, power transmission efficiency may be defined as P_receive/P_transfer, where P_receive denotes an amount of resonance power received from the target resonance unit 320, and P_transfer denotes the amount of the calibration power.

The target resonance unit 320 may receive, from the source electronic device 200 through magnetic coupling, a resonance power to be used for decoding and playback of the multimedia data. The target resonance unit 320 may further receive, from the source electronic device 200, a resonance power to be used for remaining operations excluding the decoding and the playback of the multimedia data. The target resonance unit 320 may receive, a calibration power for calibration of supply of power, from the source electronic device 200, for instance, through a magnetic coupling.

An amount of the resonance power received from the target resonance unit 320 may vary, in real-time, based on the power transmission efficiency and the power $P_t$ to be used for decoding and playback of the multimedia data in the target electronic device. The target resonance unit 320 may include the matching control 123 and the target resonator 121 of FIG. 1.

The voltage converting unit 330 may generate a DC power supply from the received resonance power. The voltage converting unit 330 may obtain a DC voltage from an AC power, and may provide the obtained DC voltage to a load. The voltage converting unit 330 may include a rectifying unit 331 that is configured to convert an AC signal to a DC signal, and may include a DC/DC converting unit 333 that adjusts a signal level of the DC signal.

The multimedia data processing unit 340 may receive multimedia data from the source electronic device 200. The multimedia data processing unit 340 may decode the multimedia data based on the DC power supply provided from the voltage converting unit 330, and may play the decoded multimedia data back. For example, the playback of the multimedia data may include video and/or audio output. As shown, the multimedia data processing unit 340 may include a demultiplexing unit & demodulating unit 343, a multimedia data playback unit 345, a display 347, and an audio outputting unit 349.

The communication unit 341 may receive the multimedia data from the source electronic device 200, or may transmit the power transmission efficiency to the source electronic device 200. The communication unit 341 may perform transmission and reception of various data by communicating with the source electronic device 200.

The demultiplexing unit & demodulating unit 343 may de-multiplex various types of multimedia data received from the source electronic device 200, or may demodulate modulated data received from the source electronic device 200.

The multimedia data playback unit 345 may decode data received from the source electronic device 200, and/or may play the decoded data back.

The display 347 may display image data. For instance, the display 347 may include a display panel and/or a display processor. The display 347 may be configured to display text data and/or various graphic data.

The audio outputting unit 349 may output audio data included in the multimedia data. For example, the audio outputting unit 349 may include a speaker.

Figure 4A:
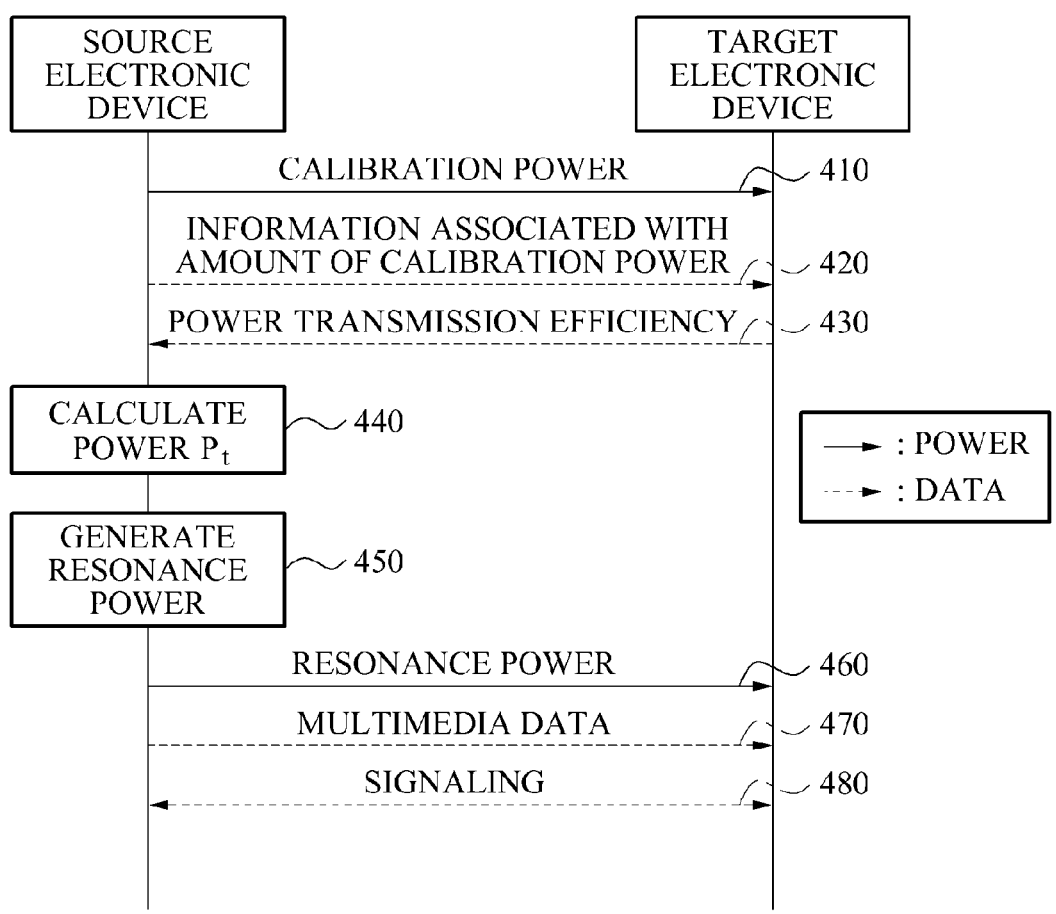
FIG. 4A is a diagram illustrating a power supplying method of an electronic device.

FIG. 4A illustrates a power supplying method of an electronic device.

Referring to FIG. 4A, the power supplying method of the electronic device may be performed by the source electronic device 200 of FIG. 2A and the target electronic device 300 of FIG. 3.

In operation 410, the source electronic device 200 may transmit calibration power to the target electronic device 300.

In operation 420, the source electronic device 200 may transmit information associated with an amount of the calibration power to the target electronic device 300. The target electronic device 300 may calculate power transmission efficiency, and may transmit the power transmission efficiency to the source electronic device 200 in operation 430. The source electronic device 200 may receive the power transmission efficiency from the target electronic device 300.

The source electronic device 200 may obtain the power transmission efficiency through operations 410 through 430. In some instances, operation 410 and operation 420 may be simultaneously performed.

In operation 440, the source electronic device 200 may obtain a power $P_t$ corresponding to an amount of power to be used for decoding and playback of multimedia data in the target electronic device 300. In operation 450, the source electronic device 200 may generate a resonance power based on the power transmission efficiency and the power $P_t$.

In operation 440, the source electronic device 200 may decode multimedia data to be transmitted to the target electronic device 300 and may obtain a power $P_{sde}$ corresponding to an amount of power to be used for decoding the multimedia data. In operation 440, the source electronic device 200 may obtain a power $P_p$ corresponding to an amount of power to be used for playback of the multimedia data in the target electronic device 300. The power $P_{sde}$ and the power $P_p$ may be obtained, for example, in real time, in response to the decoding of the multimedia data.

The source electronic device 200 may encode the multimedia data to be transmitted to the target electronic device 300, and may obtain a power $P_{sen}$ corresponding to an amount of power to be used for encoding the multimedia data. The power $P_{sen}$ and the power $P_p$ may be obtained, in real time, in response to the encoding of the multimedia data.

In operation 460, the source electronic device 200 may transfer the generated resonance power to the target electronic device 300, for example, through a magnetic coupling.

The amount of the resonance power transferred to the target electronic device 300 may be determined based on the power transmission efficiency, the power $P_{sen}$, and the power $P_p$.

In operation 470, the source electronic device 200 may transmit the multimedia data to the target electronic device 300. The target electronic device 300 may decode the multimedia data based on the received resonance power and may play the decoded multimedia data back.

In operation 480, the source electronic device 200 and the target electronic device 300 may perform signaling as to the power transmission efficiency, a change in power consumption, and/or the like, by receiving and transmitting a signaling signal. For example, when a display is only turned off or a mute function is activated while the multimedia data is being played back, the target electronic device 300 may announce, to the source electronic device 200, that the power consumption decreases.

Operations 410 through 430 may be periodically performed during transmission of the multimedia data. Therefore, the calibration of supply of power may be periodically performed.

In some implementations, the source electronic device 200 may receive a control signal for controlling a target electronic device 300 from a remote controller, and may transmit the control signal to the target electronic device 300. For example, when the target electronic device 300 is turned off and the target electronic device 300 receives a turn-on signal from the remote controller, the source electronic device 200 may transmit a resonance power to the target electronic device 300 to turn the target electronic device 300 on. If a charger is included in the target electronic device 300, the target electronic device 300 may receive a control signal from the source electronic device 200, and may receive the resonance power and thus, the target electronic device 300 may be turned on.

FIG. 4B illustrates another power supplying method of an electronic device.

Referring to FIG. 4B, the source electronic device 200 may transmit a resonance power and multimedia data to the target electronic device 300 in operations 401 through 403. Operations 401 through 403 may be simultaneously performed. For example, the multimedia data transmitted in operation 403 may be packetized and transmitted.

As illustrated in FIG. 3, the packetized data may include, for example, an image packet 1, an image packet 2, an audio packet 1, and an amount of transmitted power. The amount of the transmitted power may correspond to a power $P_{out}$. The amount of transmitted power may be a value determined based on an amount of power to be used for decoding and playback of the image packet 1, the image packet 2, and the audio packet in the target electronic device 300. The amount of power to be used for processing image data may vary based on one or more features of an image packet. In some embodiments, a magnitude of the resonance power transmitted in operation 401 may be adjusted based on the feature(s) of the image packet.

In operation 405, the target electronic device 300 may announce, to the source electronic device 200, an amount of power received via a target resonance unit 430. Therefore, the source electronic device 200 may monitor a power transmission efficiency in real-time.

Referring again to FIG. 1, the source resonator 115 and/or a target resonator 121 of the wireless power transmission system may be configured as a helix coil structured resonator, a spiral coil structured resonator, a meta-structured resonator, and/or the like.

An electromagnetic characteristic of many materials found in nature is that they have a unique magnetic permeability or a unique permittivity. Most materials typically have a positive magnetic permeability or a positive permittivity. Thus, for these materials, a right hand rule may be applied to an electric field, a magnetic field, and a pointing vector and thus, the corresponding materials may be referred to as right handed materials (RHMs).

On the other hand, a material having a magnetic permeability or a permittivity which is not ordinarily found in nature or is artificially-designed (or man-made) may be referred to herein as a "metamaterial." Metamaterials may be classified into an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

The magnetic permeability may indicate a ratio between a magnetic flux density occurring with respect to a given magnetic field in a corresponding material and a magnetic flux density occurring with respect to the given magnetic field in a vacuum state. The permittivity indicates a ratio between an electric flux density occurring with respect to a given electric field in a corresponding material and an electric flux density occurring with respect to the given electric field in a vacuum state. The magnetic permeability and the permittivity, in some embodiments, may be used to determine a propagation constant of a corresponding material in a given frequency or a given wavelength. An electromagnetic characteristic of the corresponding material may be determined based on the magnetic permeability and the permittivity. According to an aspect, the metamaterial may be easily disposed in a resonance state without significant material size changes. This may be practical for a relatively large wavelength area or a relatively low frequency area.

FIG. 5 illustrates a resonator 500 having a two-dimensional (2D) structure.

As shown, the resonator 500 having the 2D structure may include a transmission line, a capacitor 520, a matcher 530, and conductors 541 and 542. The transmission line may include, for instance, a first signal conducting portion 511, a second signal conducting portion 512, and a ground conducting portion 513.

The capacitor 520 may be inserted or otherwise positioned in series between the first signal conducting portion 511 and the second signal conducting portion 512 so that an electric field may be confined within the capacitor 520. In various implementations, the transmission line may include at least one conductor in an upper portion of the transmission line, and may also include at least one conductor in a lower portion of the transmission line. A current may flow through the at least one conductor disposed in the upper portion of the transmission line and the at least one conductor disposed in the lower portion of the transmission may be electrically grounded. As shown in FIG. 5, the resonator 500 may be configured to have a generally 2D structure. The transmission line may include the first signal conducting portion 511 and the second signal conducting portion 512 in the upper portion of the transmission line, and may include the ground conducting portion 513 in the lower portion of the transmission line. As shown, the first signal conducting portion 511 and the second signal conducting portion 512 may be disposed to face the ground conducting portion 513 with current flowing through the first signal conducting portion 511 and the second signal conducting portion 512.

In some implementations, one end of the first signal conducting portion 511 may be electrically connected (i.e., shorted) to a conductor 542, and another end of the first signal conducting portion 511 may be connected to the capacitor 520. And one end of the second signal conducting portion 512 may be grounded to the conductor 541, and another end of the second signal conducting portion 512 may be connected to the capacitor 520. Accordingly, the first signal conducting portion 511, the second signal conducting portion 512, the ground conducting portion 513, and the conductors 541 and 542 may be connected to each other, such that the resonator 500 may have an electrically "closed-loop structure." The term "closed-loop structure" as used herein, may include a polygonal structure, for example, a circular structure, a rectangular structure, or the like that is electrically closed. The capacitor 520 may be inserted into an intermediate portion of the transmission line. For example, the capacitor 520 may be inserted into a space between the first signal conducting portion 511 and the second signal conducting portion 512. The capacitor 520 may be configured, in some instances, as a lumped element, a distributed element, or the like. In one implementations, a distributed capacitor may be configured as a distributed element and may include zigzagged conductor lines and a dielectric material having a relatively high permittivity between the zigzagged conductor lines.

When the capacitor 520 is inserted into the transmission line, the resonator 500 may have a property of a metamaterial, as discussed above. For example, the resonator 500 may have a negative magnetic permeability due to the capacitance of the capacitor 520. If so, the resonator 500 may also be referred to as a mu negative (MNG) resonator. Various criteria may be applied to determine the capacitance of the capacitor 520. For example, the various criteria for enabling the resonator 500 to have the characteristic of the metamaterial may include one or more of the following: a criterion for enabling the resonator 500 to have a negative magnetic permeability in a target frequency, a criterion for enabling the resonator 500 to have a zeroth order resonance characteristic in the target frequency, or the like.

The resonator 500, also referred to as the MNG resonator 500, may also have a zeroth order resonance characteristic (i.e., having, as a resonance frequency, a frequency when a propagation constant is "0"). If the resonator 500 has the zeroth order resonance characteristic, the resonance frequency may be independent with respect to a physical size of the MNG resonator 500. Moreover, by appropriately designing the capacitor 520, the MNG resonator 500 may sufficiently change the resonance frequency without substantially changing the physical size of the MNG resonator 500 may not be changed.

In a near field, for instance, the electric field may be concentrated on the capacitor 520 inserted into the transmission line. Accordingly, due to the capacitor 520, the magnetic field may become dominant in the near field. In one or more embodiments, the MNG resonator 500 may have a relatively high Q-factor using the capacitor 520 of the lumped element. Thus, it may be possible to enhance power transmission efficiency. For example, the Q-factor indicates a level of an ohmic loss or a ratio of a reactance with respect to a resistance in the wireless power transmission. The efficiency of the wireless power transmission may increase according to an increase in the Q-factor.

The MNG resonator 500 may include a matcher 530 for impedance-matching. For example, the matcher 530 may be configured to appropriately determine and adjust the strength of a magnetic field of the MNG resonator 500. Depending on the configuration, current may flow in the MNG resonator 500 via a connector, or may flow out from the MNG resonator 500 via the connector. The connector may be connected to the ground conducting portion 513 or the matcher 530. In some instances, the power may be transferred through coupling without using a physical connection between the connector and the ground conducting portion 513 or the matcher 530.

As shown in FIG. 5, the matcher 530 may be positioned within the loop formed by the loop structure of the resonator 500. The matcher 530 may adjust the impedance of the resonator 500 by changing the physical shape of the matcher 530. For example, the matcher 530 may include the conductor 531 for the impedance-matching positioned in a location that is separate from the ground conducting portion 513 by a distance h. The impedance of the resonator 500 may be changed by adjusting the distance h.

In some instances, a controller may be provided to control the matcher 530 which generates and transmits a control signal to the matcher 530 directing the matcher to change its physical shape so that the impedance of the resonator may be adjusted. For example, the distance h between a conductor 531 of the matcher 530 and the ground conducting portion 513 may be increased or decreased based on the control signal. The controller may generate the control signal based on various factors.

As shown in FIG. 5, the matcher 530 may be configured as a passive element such as the conductor 531, for example. Of course, in other embodiments, the matcher 530 may be configured as an active element such as a diode, a transistor, or the like. If the active element is included in the matcher 530, the active element may be driven based on the control signal generated by the controller, and the impedance of the resonator 500 may be adjusted based on the control signal. For example, when the active element is a diode included in the matcher 530, the impedance of the resonator 500 may be adjusted depending on whether the diode is in an ON state or in an OFF state.

In some instances, a magnetic core may be further provided to pass through the MNG resonator 500. The magnetic core may perform a function of increasing a power transmission distance.

Figure 6:
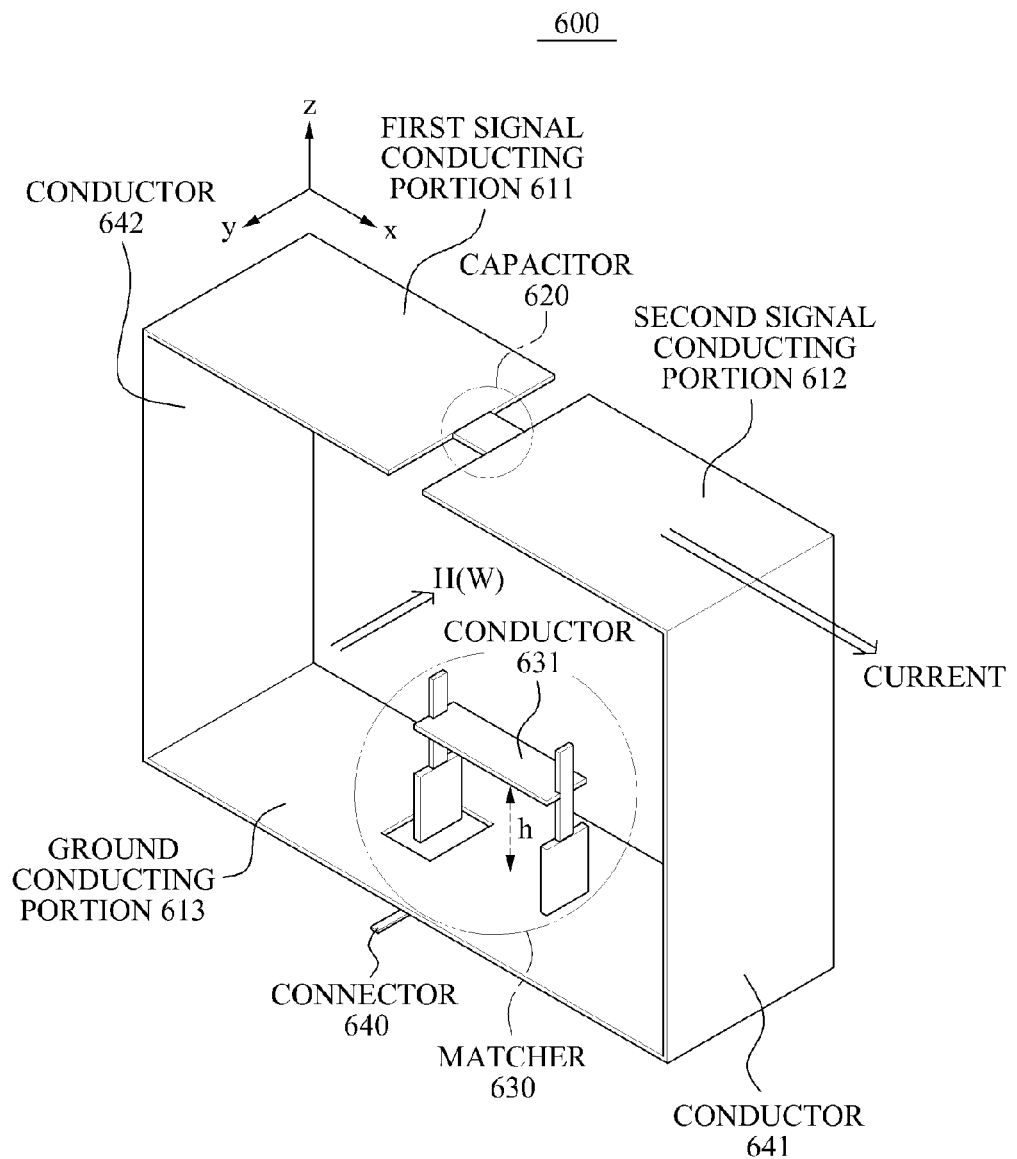

FIG. 6 illustrates a resonator 600 having a three-dimensional (3D) structure.

Referring to FIG. 6, the resonator 600 having the 3D structure may include a transmission line and a capacitor 620. The transmission line may include a first signal conducting portion 611, a second signal conducting portion 612, and a ground conducting portion 613. The capacitor 620 may be inserted, for instance, in series between the first signal conducting portion 611 and the second signal conducting portion 612 of the transmission link such that an electric field may be confined within the capacitor 620.

As shown in FIG. 6, the resonator 600 may have a generally 3D structure. The transmission line may include the first signal conducting portion 611 and the second signal conducting portion 612 in an upper portion of the resonator 600, and may include the ground conducting portion 613 in a lower portion of the resonator 600. The first signal conducting portion 611 and the second signal conducting portion 612 may be disposed to face the ground conducting portion 613. In this arrangement, current may flow in an x direction through the first signal conducting portion 611 and the second signal conducting portion 612. Due to the current, a magnetic field H(W) may be formed in a −y direction. However, it will be appreciated that the magnetic field H(W) might also be formed in the opposite direction (e.g., a +y direction) in other implementations.

In one or more embodiments, one end of the first signal conducting portion 611 may be electrically connected (i.e., shorted) to a conductor 642, and another end of the first signal conducting portion 611 may be connected to the capacitor 620. One end of the second signal conducting portion 612 may be grounded to the conductor 641, and another end of the second signal conducting portion 612 may be connected to the capacitor 620. Accordingly, the first signal conducting portion 611, the second signal conducting portion 612, the ground conducting portion 613, and the conductors 641 and 642 may be connected to each other, whereby the resonator 600 may have an electrically closed-loop structure. As shown in FIG. 6, the capacitor 620 may be inserted or otherwise positioned between the first signal conducting portion 611 and the second signal conducting portion 612. For example, the capacitor 620 may be inserted into a space between the first signal conducting portion 611 and the second signal conducting portion 612. The capacitor 620 may include, for example, a lumped element, a distributed element, and the like. In one implementation, a distributed capacitor having the shape of the distributed element may include zigzagged conductor lines and a dielectric material having a relatively high permittivity positioned between the zigzagged conductor lines.

When the capacitor 620 is inserted into the transmission line, the resonator 600 may have a property of a metamaterial, in some instances, as discussed above.

For example, when a capacitance of the capacitor inserted is a lumped element, the resonator 600 may have the characteristic of the metamaterial. When the resonator 600 has a negative magnetic permeability by appropriately adjusting the capacitance of the capacitor 620, the resonator 600 may also be referred to as an MNG resonator. Various criteria may be applied to determine the capacitance of the capacitor 620. For example, the various criteria may include, one or more of the following: a criterion for enabling the resonator 600 to have the characteristic of the metamaterial, a criterion for enabling the resonator 600 to have a negative magnetic permeability in a target frequency, a criterion enabling the resonator 600 to have a zeroth order resonance characteristic in the target frequency, or the like. Based on at least one criterion among the aforementioned criteria, the capacitance of the capacitor 620 may be determined.

The resonator 600, also referred to as the MNG resonator 600, may have a zeroth order resonance characteristic (i.e., having, as a resonance frequency, a frequency when a propagation constant is "0"). If the resonator 600 has a zeroth order resonance characteristic, the resonance frequency may be independent with respect to a physical size of the MNG resonator 600. Thus, by appropriately designing the capacitor 620, the MNG resonator 600 may sufficiently change the resonance frequency without substantially changing the physical size of the MNG resonator 600 may not be changed.

Referring to the MNG resonator 600 of FIG. 6, in a near field, the electric field may be concentrated on the capacitor 620 inserted into the transmission line. Accordingly, due to the capacitor 620, the magnetic field may become dominant in the near field. And, since the MNG resonator 600 having the zeroth-order resonance characteristic may have characteristics similar to a magnetic dipole, the magnetic field may become dominant in the near field. A relatively small amount of the electric field formed due to the insertion of the capacitor 620 may be concentrated on the capacitor 620 and thus, the magnetic field may become further dominant.

Also, the MNG resonator 600 may include a matcher 630 for impedance-matching. The matcher 630 may be configured to appropriately adjust the strength of magnetic field of the MNG resonator 600. The impedance of the MNG resonator 600 may be determined by the matcher 630. In one or more embodiments, current may flow in the MNG resonator 600 via a connector 640, or may flow out from the MNG resonator 600 via the connector 640. And the connector 640 may be connected to the ground conducting portion 613 or the matcher 630.

As shown in FIG. 6, the matcher 630 may be positioned within the loop formed by the loop structure of the resonator 600. The matcher 630 may be configured to adjust the impedance of the resonator 600 by changing the physical shape of the matcher 630. For example, the matcher 630 may include the conductor 631 for the impedance-matching in a location separate from the ground conducting portion 613 by a distance h. The impedance of the resonator 600 may be changed by adjusting the distance h.

In some implementations, a controller may be provided to control the matcher 630. In this case, the matcher 630 may change the physical shape of the matcher 630 based on a control signal generated by the controller. For example, the distance h between the conductor 631 of the matcher 630 and the ground conducting portion 613 may be increased or decreased based on the control signal. Accordingly, the physical shape of the matcher 630 may be changed such that the impedance of the resonator 600 may be adjusted. The distance h between the conductor 631 of the matcher 630 and the ground conducting portion 613 may be adjusted using a variety of schemes. For example, a plurality of conductors may be included in the matcher 630 and the distance h may be adjusted by adaptively activating one of the conductors. Alternatively or additionally, the distance h may be adjusted by adjusting the physical location of the conductor 631 up and down. For instance, the distance h may be controlled based on the control signal of the controller. The controller may generate the control signal using various factors. As shown in FIG. 6, the matcher 630 may be configured as a passive element such as the conductor 631, for instance. Of course, in other embodiments, the matcher 630 may be configured as an active element such as a diode, a transistor, or the like. When the active element is included in the matcher 630, the active element may be driven based on the control signal generated by the controller, and the impedance of the resonator 600 may be adjusted based on the control signal. For example, if the active element is a diode included in the matcher 630, the impedance of the resonator 600 may be adjusted depending on whether the diode is in an ON state or in an OFF state.

In some implementations, a magnetic core may be further provided to pass through the resonator 600 configured as the MNG resonator. The magnetic core may perform a function of increasing a power transmission distance.

Figure 7:
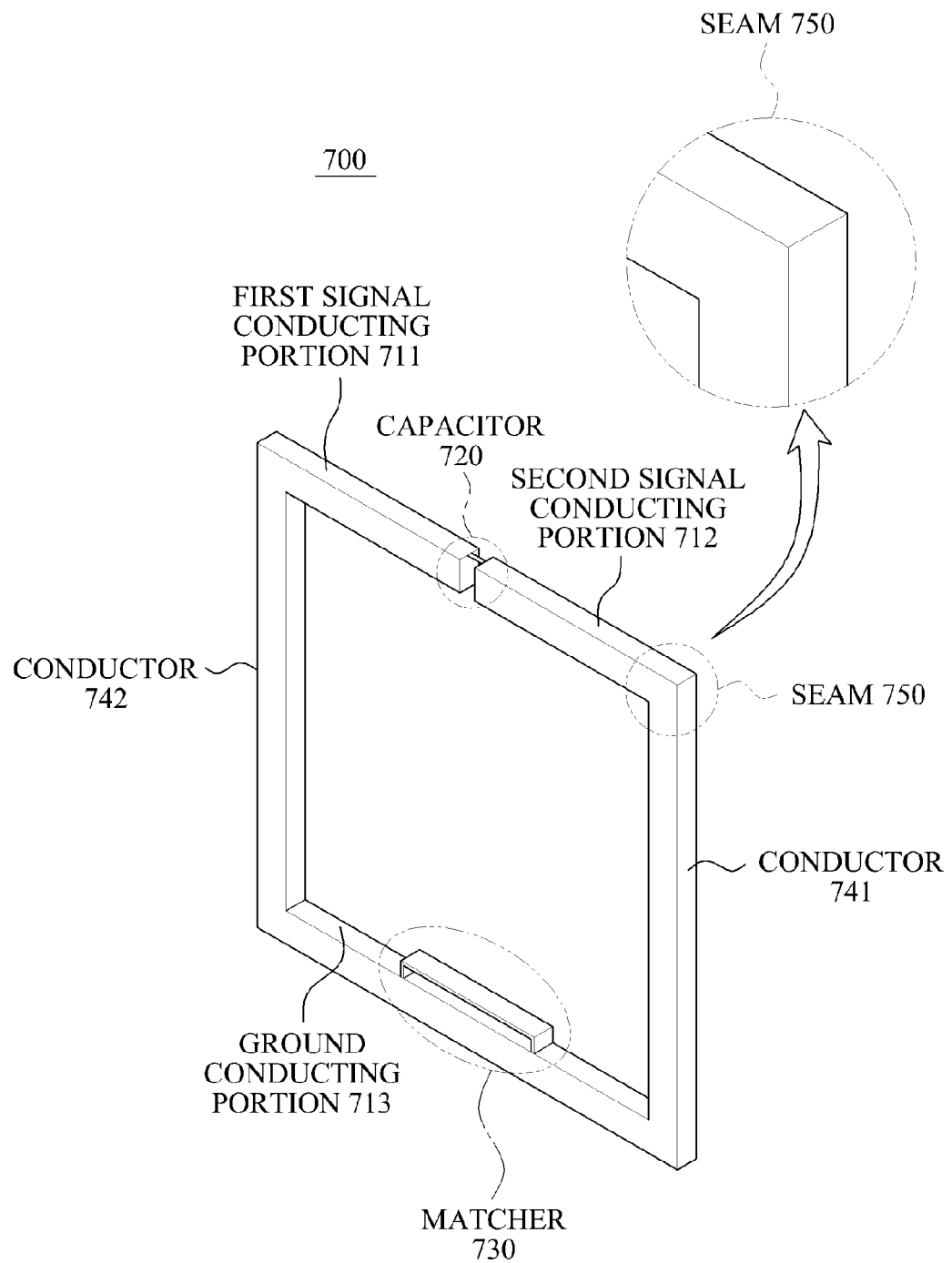

FIG. 7 illustrates a resonator 700 for a wireless power transmission configured as a bulky type.

As used herein, the term "bulky type" may refer to a seamless connection connecting at least two parts in an integrated form.

Referring to FIG. 7, a first signal conducting portion 711 and a conductor 742 may be integrally formed instead of being separately manufactured and thereby be connected to each other. Similarly, a second signal conducting portion 712 and a conductor 741 may also be integrally manufactured.

When the second signal conducting portion 712 and the conductor 741 are separately manufactured and then are connected to each other, a loss of conduction may occur due to a seam 750. Thus, in some implementations, the second signal conducting portion 712 and the conductor 741 may be connected to each other without using a separate seam (i.e., seamlessly connected to each other). Accordingly, it is possible to decrease a conductor loss caused by the seam 750. For instance, the second signal conducting portion 712 and a ground conducting portion 713 may be seamlessly and integrally manufactured. Similarly, the first signal conducting portion 711, the conductor 742 and the ground conducting portion 713 may be seamlessly and integrally manufactured.

Figure 8:
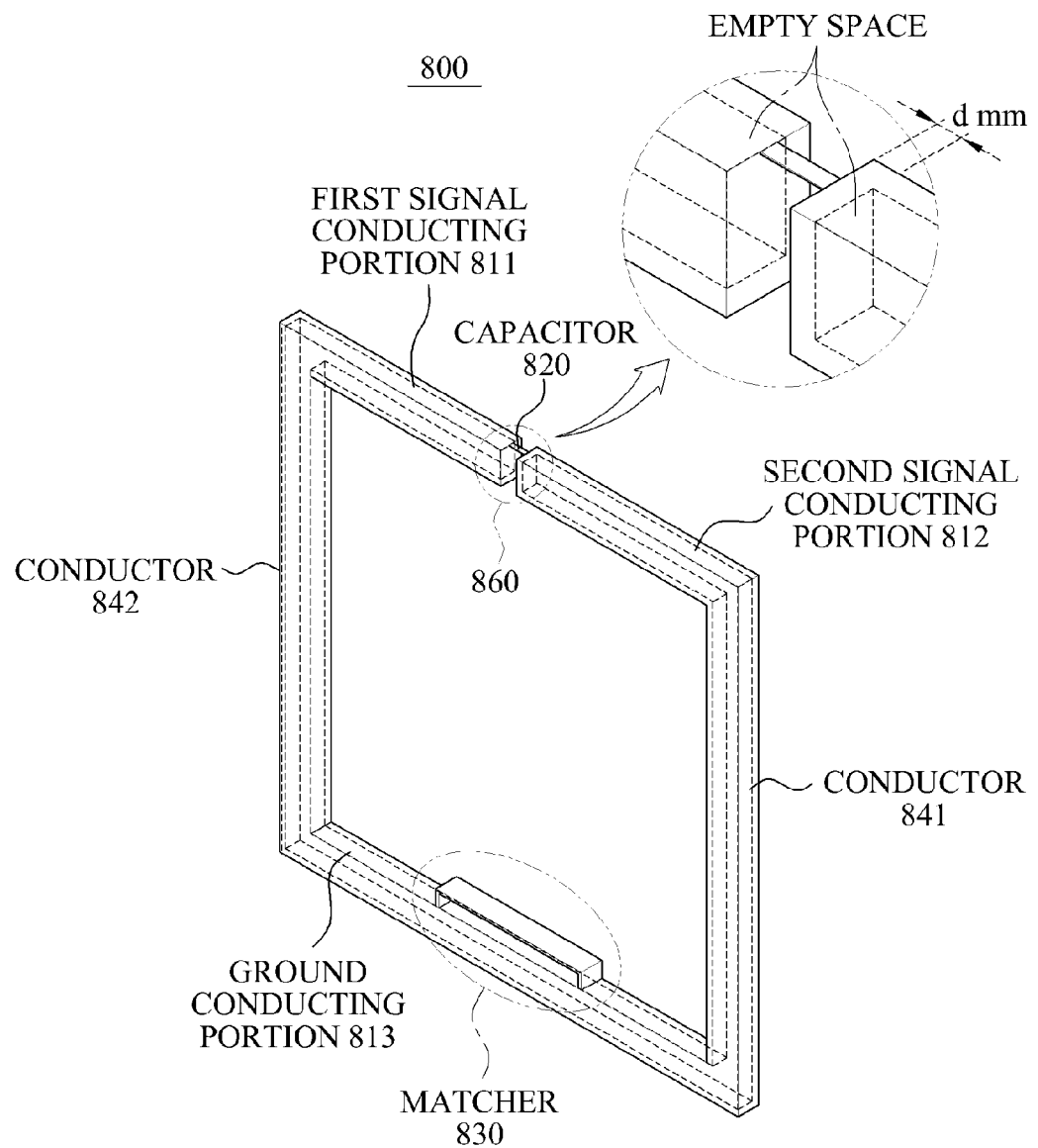

A matcher 730 may be provided that is similarly constructed as described herein in one or more embodiments. FIG. 8 illustrates a resonator 800 for a wireless power transmission, configured as a hollow type.

Referring to FIG. 8, each of a first signal conducting portion 811, a second signal conducting portion 812, a ground conducting portion 813, and conductors 841 and 842 of the resonator 800 configured as the hollow type structure. As used herein the term "hollow type" refers to a configuration that may include an empty space inside.

For a given resonance frequency, an active current may be modeled to flow in only a portion of the first signal conducting portion 811 instead of all of the first signal conducting portion 811, the second signal conducting portion 812 instead of all of the second signal conducting portion 812, the ground conducting portion 813 instead of all of the ground conducting portion 813, and the conductors 841 and 842 instead of all of the conductors 841 and 842. When a depth of each of the first signal conducting portion 811, the second signal conducting portion 812, the ground conducting portion 813, and the conductors 841 and 842 is significantly deeper than a corresponding skin depth in the given resonance frequency, it may be ineffective. The significantly deeper depth may, however, increase a weight or manufacturing costs of the resonator 800 in some instances.

Accordingly, for the given resonance frequency, the depth of each of the first signal conducting portion 811, the second signal conducting portion 812, the ground conducting portion 813, and the conductors 841 and 842 may be appropriately determined based on the corresponding skin depth of each of the first signal conducting portion 811, the second signal conducting portion 812, the ground conducting portion 813, and the conductors 841 and 842. When each of the first signal conducting portion 811, the second signal conducting portion 812, the ground conducting portion 813, and the conductors 841 and 842 has an appropriate depth deeper than a corresponding skin depth, the resonator 800 may become light, and manufacturing costs of the resonator 800 may also decrease.

For example, as shown in FIG. 8, the depth of the second signal conducting portion 812 (as further illustrated in the enlarged view region 860 indicated by a circle) may be determined as "d" mm and d may be determined according to $$d = \frac{1}{\sqrt{\pi f \mu \sigma}}.$$

Here, f denotes a frequency, μ denotes a magnetic permeability, and σ denotes a conductor constant. In one implementation, when the first signal conducting portion 811, the second signal conducting portion 812, the ground conducting portion 813, and the conductors 841 and 842 are made of a copper and they may have a conductivity of $5.8 \times 10^7$ siemens per meter (S·m−1), the skin depth may be about 0.6 mm with respect to 10 kHz of the resonance frequency and the skin depth may be about 0.006 mm with respect to 100 MHz of the resonance frequency. A capacitor 820 and a matcher 830 may be provided that are similarly constructed as described herein in one or more embodiments.

Figure 9:
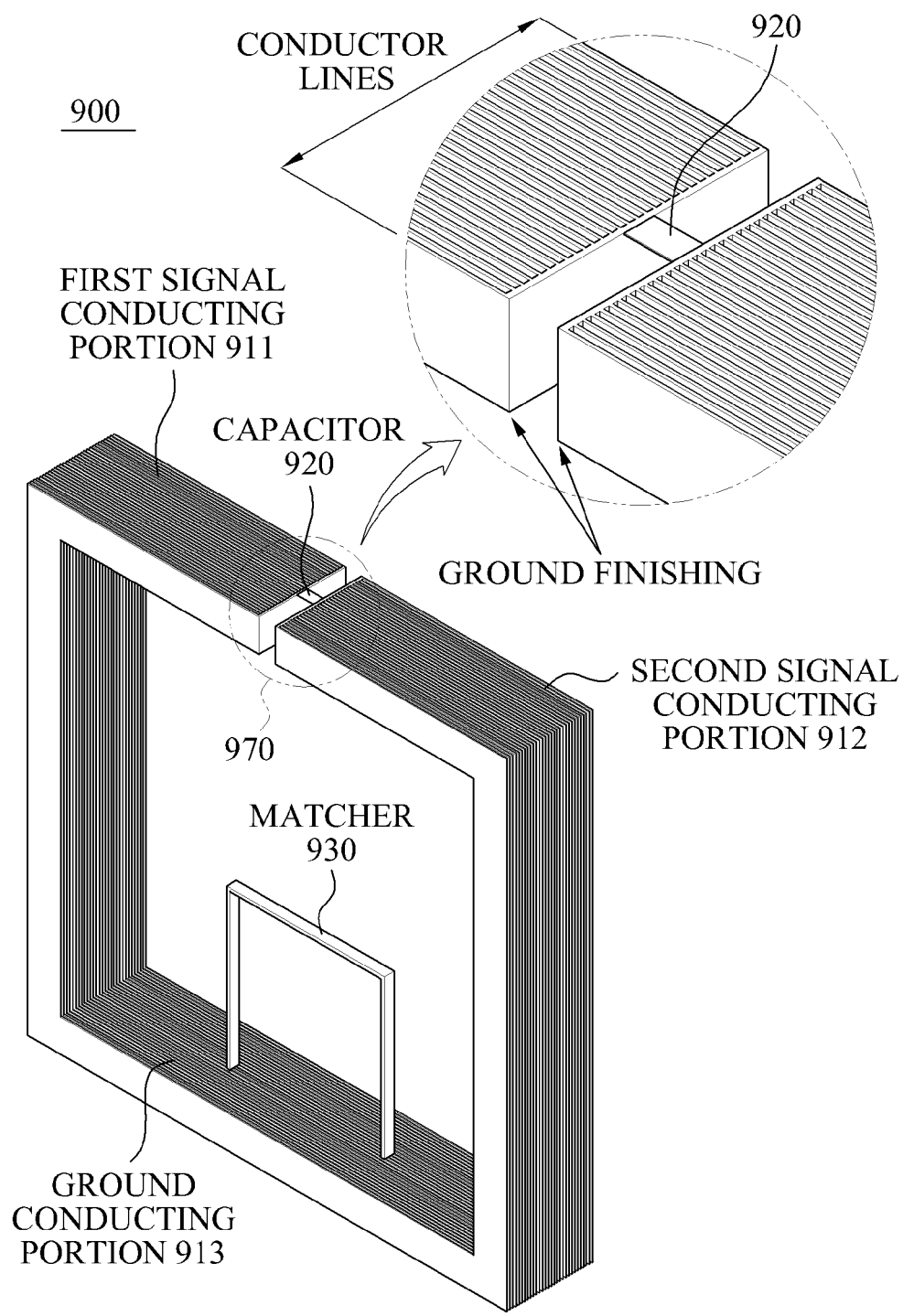

FIG. 9 illustrates a resonator 900 for a wireless power transmission using a parallel-sheet.

Referring to FIG. 9, the parallel-sheet may be applicable to each of a first signal conducting portion 911 and a second signal conducting portion 912 included in the resonator 900.

Each of the first signal conducting portion 911 and the second signal conducting portion 912 may not be a perfect conductor and thus, may have an inherent resistance. Due to this resistance, an ohmic loss may occur. The ohmic loss may decrease a Q-factor and also decrease a coupling effect.

By applying the parallel-sheet to each of the first signal conducting portion 911 and the second signal conducting portion 912, it may be possible to decrease the ohmic loss, and to increase the Q-factor and the coupling effect. Referring to the enlarged view portion 970 indicated by a circle, when the parallel-sheet is applied, each of the first signal conducting portion 911 and the second signal conducting portion 912 may include a plurality of conductor lines. The plurality of conductor lines may be disposed in parallel, and may be electrically connected (i.e., shorted) at an end portion of each of the first signal conducting portion 911 and the second signal conducting portion 912.

When the parallel-sheet is applied to each of the first signal conducting portion 911 and the second signal conducting portion 912, the plurality of conductor lines may be disposed in parallel. Accordingly, a sum of resistances having the conductor lines may decrease. Consequently, the resistance loss may decrease, and the Q-factor and the coupling effect may increase.

Figure 10:
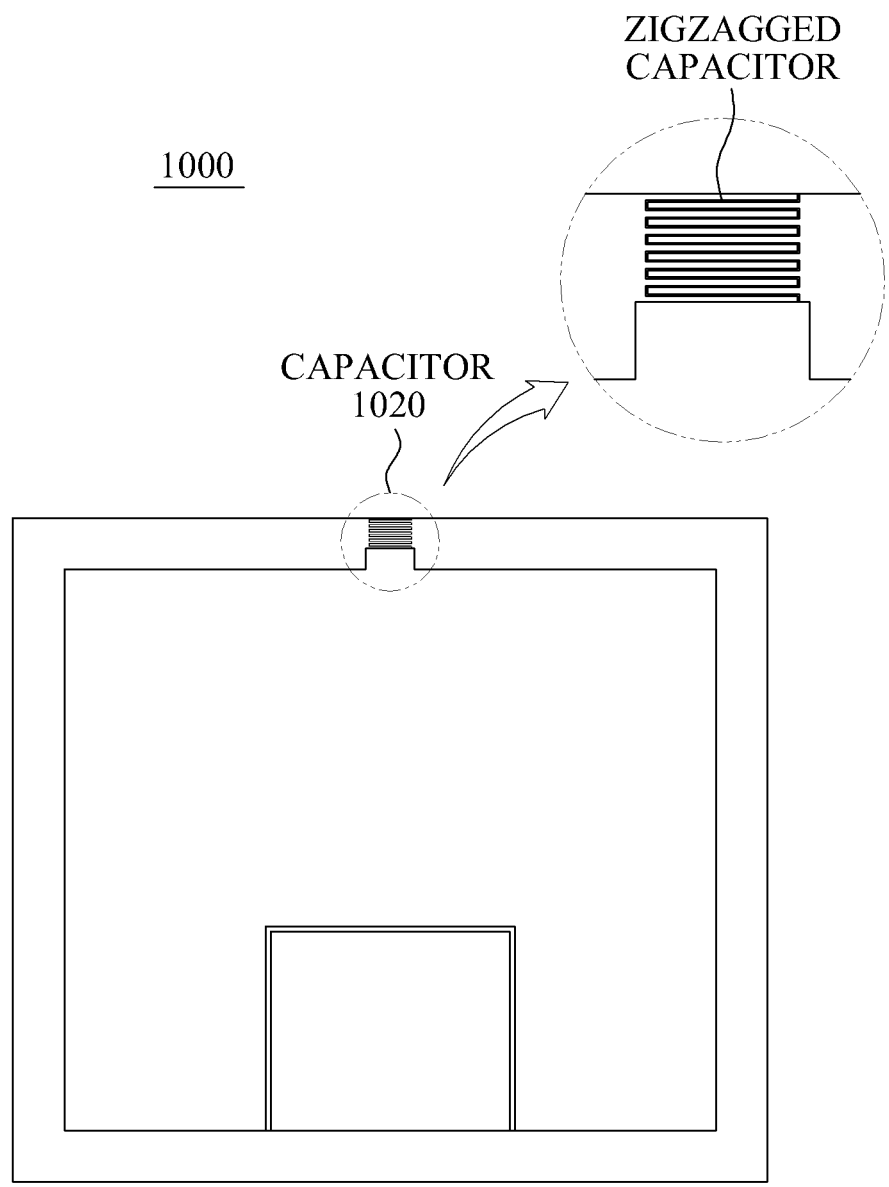

A capacitor 920 and a matcher 930 positioned on the ground conducting portion 1013 may be provided that are similarly constructed as described herein in one or more embodiments. FIG. 10 illustrates a resonator 1000 for a wireless power transmission, including a distributed capacitor.

Referring to FIG. 10, a capacitor 1020 included in the resonator 1000 is configured for the wireless power transmission. A capacitor as a lumped element may have a relatively high equivalent series resistance (ESR). A variety of schemes have been proposed to decrease the ESR contained in the capacitor of the lumped element. According to an embodiment, by using the capacitor 1020 as a distributed element, it may be possible to decrease the ESR. As will be appreciated, a loss caused by the ESR may decrease a Q-factor and a coupling effect.

As shown in FIG. 10, the capacitor 1020 may be configured as a conductive line having the zigzagged structure.

By employing the capacitor 1020 as the distributed element, it may be possible to decrease the loss occurring due to the ESR in some instances. In addition, by disposing a plurality of capacitors as lumped elements, it is possible to decrease the loss occurring due to the ESR. Since a resistance of each of the capacitors as the lumped elements decreases through a parallel connection, active resistances of parallel-connected capacitors as the lumped elements may also decrease whereby the loss occurring due to the ESR may decrease. For example, by employing ten capacitors of 1 pF each instead of using a single capacitor of 10 pF, it may be possible to decrease the loss occurring due to the ESR in some instances.

Figure 11A:
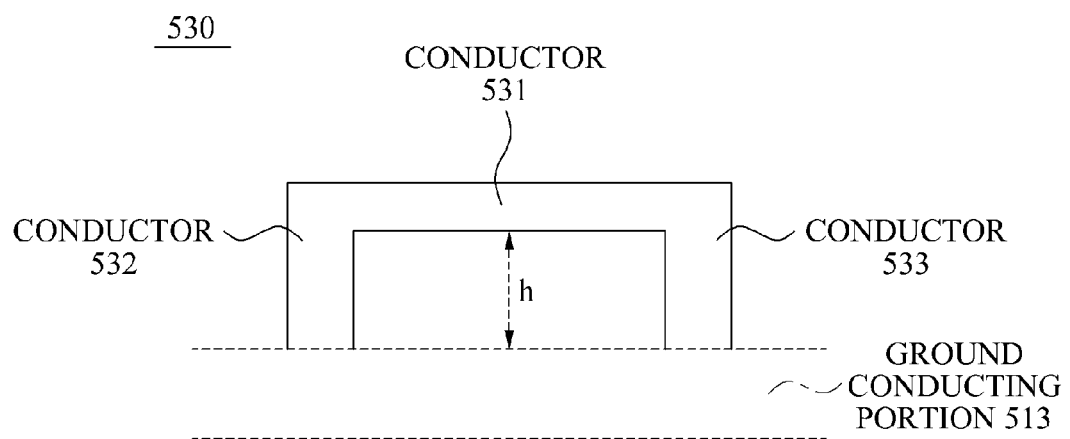
Figure 11B:
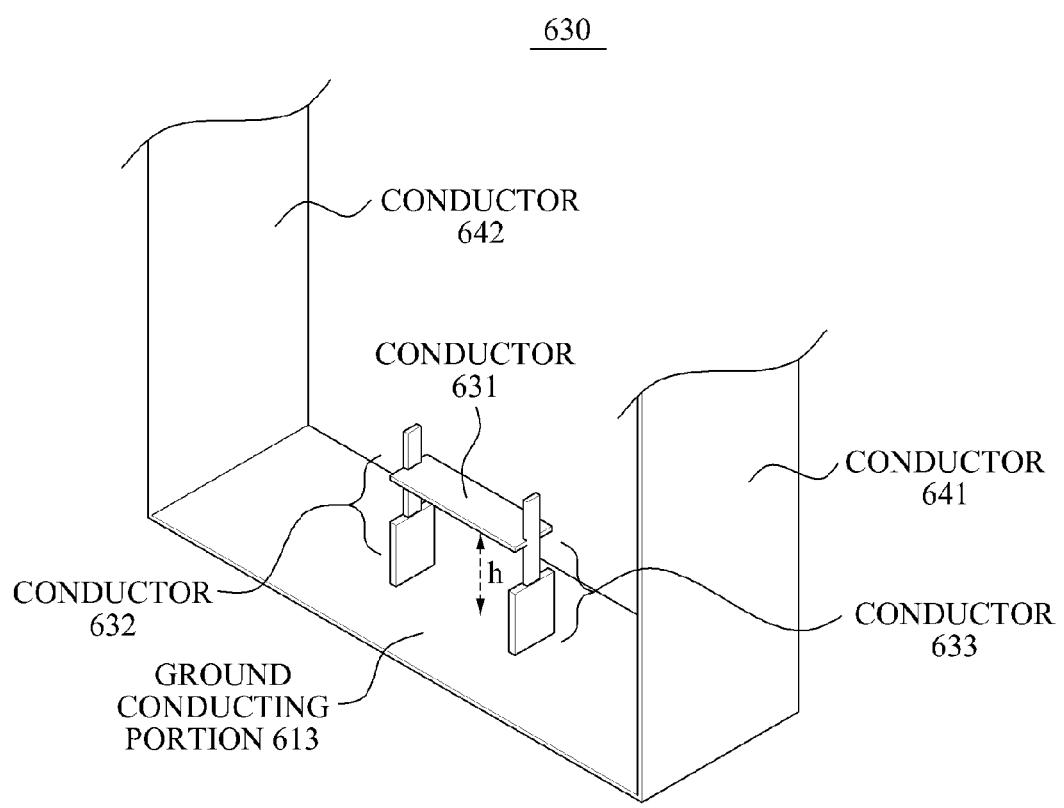

FIG. 11A illustrates one embodiment of the matcher 530 used in the resonator 500 provided in the 2D structure of FIG. 5, and FIG. 11B illustrates an example of the matcher 630 used in the resonator 600 provided in the 3D structure of FIG. 6.

FIG. 11A illustrates a portion of the 2D resonator including the matcher 530, and FIG. 11B illustrates a portion of the 3D resonator of FIG. 6 including the matcher 630.

Referring to FIG. 11A, the matcher 530 may include the conductor 531, a conductor 532, and a conductor 533. The conductors 532 and 533 may be connected to the ground conducting portion 513 and the conductor 531. The impedance of the 2D resonator may be determined based on a distance h between the conductor 531 and the ground conducting portion 513. The distance h between the conductor 531 and the ground conducting portion 513 may be controlled by the controller. The distance h between the conductor 531 and the ground conducting portion 513 may be adjusted using a variety of schemes. For example, the variety of schemes may include one or more of the following: a scheme of adjusting the distance h by adaptively activating one of the conductors 531, 532, and 533, a scheme of adjusting the physical location of the conductor 531 up and down, and/or the like.

Referring to FIG. 11B, the matcher 630 may include the conductor 631, a conductor 632, a conductor 633 and conductors 641 and 642. The conductors 632 and 633 may be connected to the ground conducting portion 613 and the conductor 631. Also, the conductors 641 and 642 may be connected to the ground conducting portion 613. The impedance of the 3D resonator may be determined based on a distance h between the conductor 631 and the ground conducting portion 613. The distance h between the conductor 631 and the ground conducting portion 613 may be controlled by the controller, for example. Similar to the matcher 530 included in the 2D structured resonator, in the matcher 630 included in the 3D structured resonator, the distance h between the conductor 631 and the ground conducting portion 613 may be adjusted using a variety of schemes. For example, the variety of schemes may include one or more of the following: a scheme of adjusting the distance h by adaptively activating one of the conductors 631, 632, and 633, a scheme of adjusting the physical location of the conductor 631 up and down, or the like.

in some implementations, the matcher may include an active element. Thus, a scheme of adjusting an impedance of a resonator using the active element may be similar as described above. For example, the impedance of the resonator may be adjusted by changing a path of a current flowing through the matcher using the active element.

Figure 12:
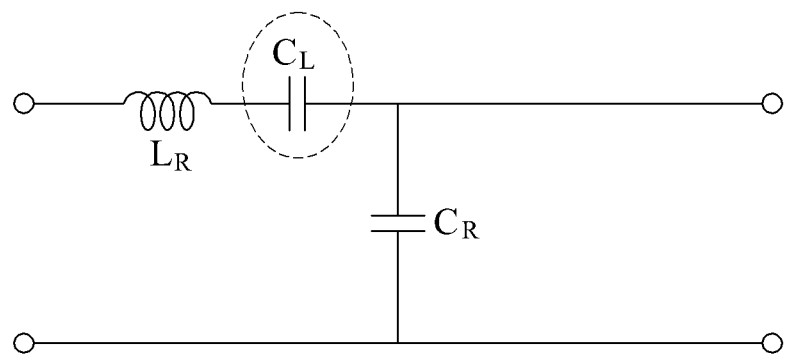
FIG. 12 is a diagram illustrating one equivalent circuit of a resonator for wireless power transmission of FIG. 5.

FIG. 12 illustrates one equivalent circuit of the resonator 500 for the wireless power transmission of FIG. 5.

The resonator 500 of FIG. 5 for the wireless power transmission may be modeled to the equivalent circuit of FIG. 12. In the equivalent circuit depicted in FIG. 12, $L_R$ denotes an inductance of the power transmission line, $C_L$ denotes the capacitor 520 that is inserted in a form of a lumped element in the middle of the power transmission line, and $C_R$ denotes a capacitance between the power transmissions and/or ground of FIG. 5.

In some instances, the resonator 500 may have a zeroth resonance characteristic. For example, when a propagation constant is "0", the resonator 500 may be assumed to have $\omega_{MZR}$ as a resonance frequency. The resonance frequency $\omega_{MZR}$ may be expressed by Equation 4.

$$\omega_{MZR} = \frac{1}{\sqrt{L_R C_L}} \quad \text{[Equation 4]}$$

In Equation 4, MZR denotes a Mu zero resonator.

Referring to Equation 4, the resonance frequency $\omega_{MZR}$ of the resonator 500 may be determined by $$\frac{L_R}{C_L}.$$

A physical size of the resonator 500 and the resonance frequency $\omega_{MZR}$ may be independent with respect to each other. Since the physical sizes are independent with respect to each other, the physical size of the resonator 500 may be sufficiently reduced.

According to various embodiments, a resonance power may be transmitted based on an amount power to be used in a target electronic device and thus, power loss may decrease. An amount of resonance power transmitted from a source electronic device to the target electronic device may be accurately calculated.

The units described herein may be implemented using hardware components and software components. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A power supplying method executed by a source electronic device, the method comprising:
    identifying the power transmission efficiency between the source electronic device and a target electronic device;
    identifying the power required for decoding and playback of multimedia data in the target electronic device;
    generating resonance power based on the power transmission efficiency and the power required for decoding and playback of the multimedia data in the target electronic device; and
    transmitting the generated resonance power and multimedia data to the target electronic device,
    wherein a magnitude of the generated resonance power is adjusted based on one or more features of the multimedia data;
    encoding, with the source electronic device, the multimedia data; and
    identifying the power required for encoding the multimedia data, wherein the power required for encoding the multimedia data and the power required for playback of the multimedia data in the target electronic device are identified based on a decoding of the multimedia data in the source electronic device.

2. The method of claim 1, further comprising:
    transmitting, to the target electronic device, calibration power for calibrating a supply of power and information of the calibration power; and
    receiving the power transmission efficiency calculated based on the calibration power and the information of the calibration power from the target electronic device.

3. The method of claim 1, further comprising:
    decoding the multimedia data in the source electronic device;
    identifying the power required for decoding the multimedia data in the target electronic device; and
    identifying the power required for playback of the multimedia data in the target electronic device, wherein
    the power required for decoding and playback of the multimedia data in the target electronic device are identified in response to the decoding of the multimedia data.

4. The method of claim 3, wherein the amount of generated resonance power is determined based on the power transmission efficiency and the identified power required for decoding and playback of the multimedia data in the target electronic device.

5. The method of claim 1, wherein the amount of the generated resonance power is determined based on the power transmission efficiency information, the identified power required for encoding the multimedia data, the identified power required for playback of the multimedia data, or a combination thereof.

6. The method of claim 1, wherein the magnitude of the resonance power is varied based on a power used by the source electronic device to process the multimedia data.

7. A power supplying method executed by a target electronic device, the method comprising:
    calculating power transmission efficiency between a source electronic device and the target electronic device;
    transmitting information of the power transmission efficiency to the source electronic device;
    receiving, from the source electronic device, multimedia data and resonance power; and
    applying the received resonance power to the decoding of the multimedia data and playback of the decoded multimedia data,
    wherein a magnitude of the generated resonance power is adjusted based on one or more features of the multimedia data,
    wherein a power required for encoding the multimedia data in the source electronic device and the power required for playback of the multimedia data in the target electronic device are identified based on a encoding of the multimedia data in the source electronic device.

8. The method of claim 7, further comprising:
    receiving calibration power for calibration of a supply of power; and
    receiving information of the calibration power, wherein
    the power transmission efficiency is calculated based on the received calibration power and the information of the calibration power.

9. The method of claim 7, wherein the amount of resonance power varies based on the power transmission efficiency information and the power required for decoding and playback of the multimedia data in the target electronic device.

10. A source electronic device comprising:
    a source controlling unit configured to identify the power transmission efficiency between the source electronic device and a target electronic device and to identify the power required for decoding and playback of multimedia data in the target electronic device;
    a resonance power generating unit configured to generate resonance power based on the identified power transmission efficiency and the identified power required for decoding and playback of the multimedia data in the target electronic device;
    a source resonance unit configured to transmit the generated resonance power to the target electronic device; and
    a multimedia data processing unit configured to transmit the multimedia data to the target electronic device,
    wherein a magnitude of the generated resonance power is adjusted based on one or more features of the multimedia data,
    wherein the source controlling unit identifies the power required for encoding the multimedia data in the source electronic device, identifies the power required for playback of the multimedia data in the target electronic device, and determines the amount of resonance power to be generated by the resonance power generating unit based on the power transmission efficiency information, the power required for encoding the multimedia data, the power required for playback of the multimedia data in the target device, or a combination thereof.

11. The device of claim 10, wherein the source controlling unit transmits calibration power for calibration of a supply of power and information of the calibration power,
    wherein the power transmission efficiency is calculated based on the calibration power and information of the calibration power.

12. The device of claim 10, wherein the source controlling unit identifies the power required for decoding the multimedia data in the target electronic device, identifies the power required for playback of the multimedia data in the target electronic device, and determines the amount of resonance power to be generated by the resonance power generating unit based on the power transmission efficiency information, the power required for decoding the multimedia data in the target electronic device, the power required for playback of the multimedia data in the target electronic device, or a combination thereof.

13. A target electronic device comprising:
- a target controlling unit configured to calculate power transmission efficiency between a source electronic device and the target electronic device and to transmit information of the power transmission efficiency to the source electronic device;
- a target resonance unit configured to receive resonance power;
- a voltage converting unit configured to generate direct current (DC) power from the received resonance power; and
- a data processing unit configured to receive multimedia data from the source electronic device, to decode the multimedia data using the DC power, and to perform playback of the decoded multimedia data using the DC power,
- wherein a power required for encoding the multimedia data in the source electronic device and the power required for playback of the multimedia data in the target electronic device are identified based on a encoding of the multimedia data in the source electronic device.

14. The device of claim 13, wherein:
- the target resonance unit receives calibration power for calibration of a supply of power; and
- the target controlling unit calculates the power transmission efficiency based on the amount of calibration power received from the source electronic device and information associated with the amount of calibration power.

15. The device of claim 13, wherein the amount of generated resonance power varies based on the power transmission efficiency and the power required for decoding and playback of the multimedia data in the target electronic device.

* * * * *